(12) United States Patent
Kapoor

(10) Patent No.: US 9,892,000 B2
(45) Date of Patent: Feb. 13, 2018

(54) UNDO CHANGES ON A CLIENT DEVICE

(71) Applicant: Dropbox, Inc., San Francisco, CA (US)

(72) Inventor: Shiv Kapoor, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 388 days.

(21) Appl. No.: 14/473,931

(22) Filed: Aug. 29, 2014

(65) Prior Publication Data

US 2016/0062839 A1 Mar. 3, 2016

(51) Int. Cl.
*G06F 17/30* (2006.01)
*G06F 11/14* (2006.01)
*G06F 9/30* (2018.01)

(52) U.S. Cl.
CPC ...... *G06F 11/1446* (2013.01); *G06F 9/30032* (2013.01); *G06F 17/30117* (2013.01)

(58) Field of Classification Search
CPC .......................... G06F 17/30575; G06F 17/24
See application file for complete search history.

(56) References Cited

U.S. PATENT DOCUMENTS

| | | | |
|---|---|---|---|
| 8,825,597 B1* | 9/2014 | Houston | H04L 67/06 707/610 |
| 2009/0138808 A1* | 5/2009 | Moromisato | G06Q 10/10 715/758 |
| 2009/0172101 A1* | 7/2009 | Arthursson | G06F 3/0486 709/205 |
| 2013/0201352 A1* | 8/2013 | Masukawa | G06T 3/40 348/207.1 |
| 2013/0290464 A1* | 10/2013 | Barrall | G06F 15/167 709/213 |

* cited by examiner

*Primary Examiner* — Hung Q Pham
(74) *Attorney, Agent, or Firm* — Polsinelli PC

(57) ABSTRACT

In some implementations, a user can be notified when a content item operation initiated by the user on a client device may render a shared or linked content item inaccessible to the user or others. The notification can give the user an option to undo the content item operation. In some implementations, movement of a content item from one directory location to another directory location can be recorded in entries of a local content journal. The local content journal entries can be shared with a content management system and other client devices so that the corresponding content items on the client devices can be moved without downloading additional copies of the content item to the client devices.

20 Claims, 10 Drawing Sheets

| Content Pointer | Content Library ID | Journal No. | Content Path | Latest Flag | Dir Flag | Content Size | Shared | Moved |
|---|---|---|---|---|---|---|---|---|
| 001 | 178 | 1 | /Readme.txt | True | False | 85 | False | -1 |
| Null | 178 | 2 | /Photos | True | True | 0 | True | -1 |
| 1002 | 178 | 3 | /Photos/Face.jpg | True | False | 9321 | True | -1 |

FIG. 2

| Content Pointer | Content Library ID | Journal No. | Content Path | Latest Flag | Dir Flag | Content Size | Shared | Moved |
|---|---|---|---|---|---|---|---|---|
| 001 | 178 | 1 | /Readme.txt | True | False | 85 | False | -1 |
| Null | 178 | 2 | /Photos | True | True | 0 | True | -1 |
| 1002 | 178 | 3 | /Photos/Face.jpg | False | False | 9321 | True | -1 |
| 1002 | 178 | 4 | /Photos/Face.jpg | True | False | -1 | True | 33 |
| Null | 178 | 5 | /Vacation | True | True | 0 | False | -1 |
| 1002 | 178 | 6 | /Vacation/Face.jpg | True | False | 9321 | False | 33 |

FIG. 3

UNDO CHANGES ON A CLIENT DEVICE

TECHNICAL FIELD

The present technology pertains to a content library, and more specifically pertains to prompting the user to undo changes made to the content library at a client device.

BACKGROUND

Online content management systems enable users to store content items online so that the content items can be accessed from a variety of client devices. These online content management systems enable a user to upload content items to the online content storage and access the stored content items from the online storage. While these systems do allow the content item to be accessed from multiple client devices, a network connection is required to access the stored content items. To access the content items when a network connection is unavailable, a user must maintain a copy of the content library locally on a client device.

Ensuring that the content library is synchronized between the content storage system and client devices is often left to the user and can result in inconsistent content libraries and lost changes. For example, to maintain a synchronized content library across the content storage system and two client devices, changes made to a content item on a first client device must be uploaded to replace the content item on the content management system and then downloaded to the second client device to replace the content item stored on the second client device. If the user makes revisions to the content item stored on the second client device without first downloading the revised content item, the changes made to the content item on the first client device will not be reflected in the version of the content item stored on the second client device, and vice versa.

Further, some content management systems allow users to share content items in the content library with other users. However, when a user shares a content item and subsequently moves or deletes the content item, the shared content item may no longer be accessible to other users. Accordingly, a need exists for an improved method of informing users when the user's actions may cause shared content items to become unavailable to other users.

SUMMARY

In some implementations, a user can be notified when a content item operation initiated by the user on a client device may render a shared or linked content item inaccessible to the user or others. The notification can give the user an option to undo the content item operation.

In some implementations, movement of a content item from one directory location to another directory location can be recorded in entries of a local content journal. The local content journal entries can be shared with a content management system and other client devices so that the corresponding content items on the client devices can be moved without downloading additional copies of the content item to the client devices.

BRIEF DESCRIPTION OF THE DRAWINGS

FIG. 2 shows an example server content journal;

FIG. 3 shows an example of using content size to indicate that a content item has been deleted from a content library;

DESCRIPTION

Figure 1:
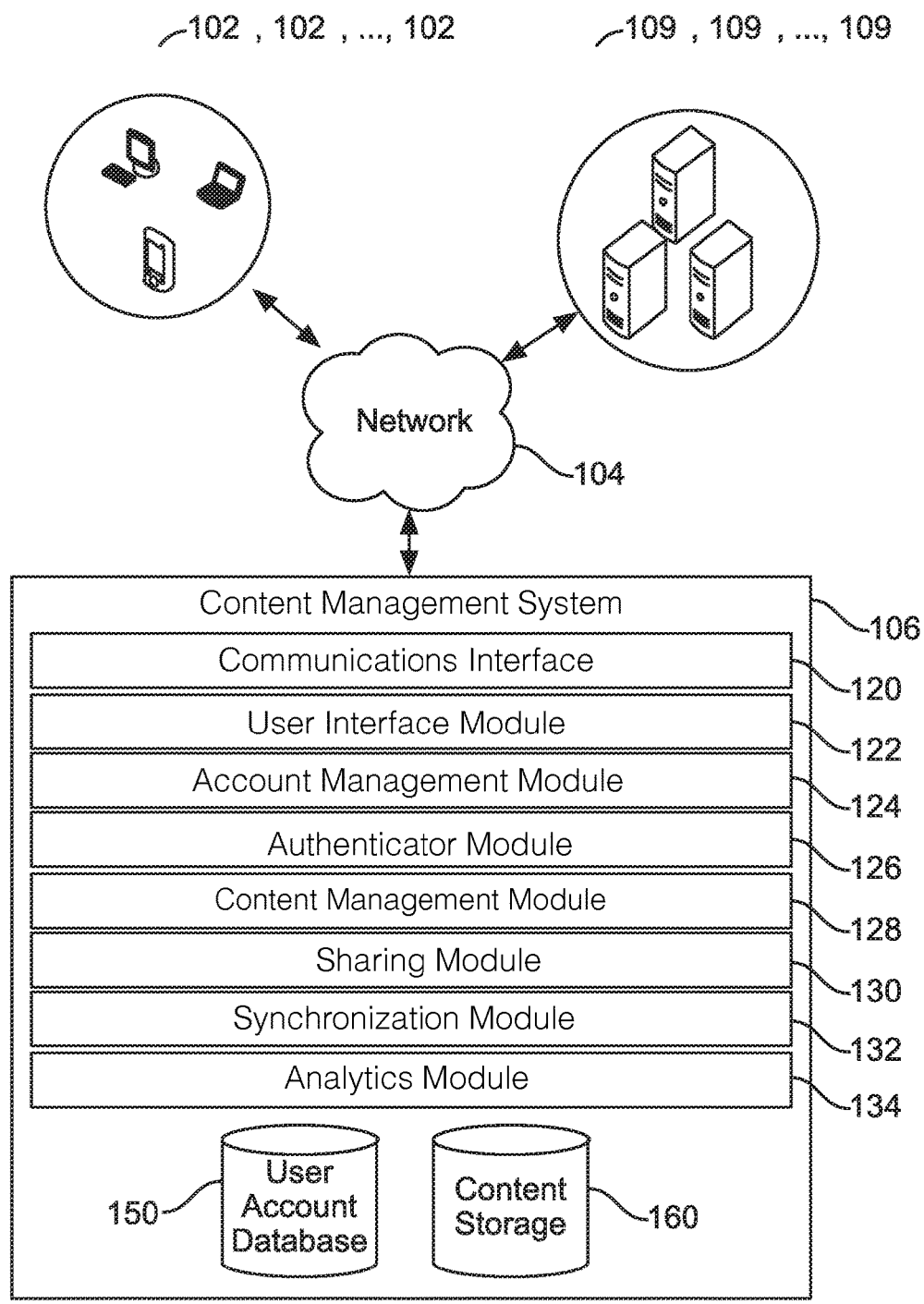
FIG. 1 shows an example configuration of devices and a network in accordance with the invention.

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for synchronizing a content library between a content management system and client devices. A content library can consist of any number of individual content items. A content item can be any type of content item such as a document, text content item, audio content item, video content item, etc. Further, a content item can be a folder or other mechanism of grouping content items together.

The disclosed technology can enable a user to store content items in a content library that can be access and modified from multiple client devices. Changes made to the content library when accessed from a first client device, including adding, deleting or modifying content items, can be synchronized across other client devices used to access the content library. Synchronizing can include changing the content library stored on a client device such that the content library is the same when accessed on each client device. A user can thus manage their content library from a first client device and any changes made to the content library from the first user device can be synchronized such that the content library reflects the changes when accessed from a second client device.

To accomplish this, the disclosed technology can be configured to store each content item in a user's content library in a content storage of the content management system. As the content items are added, deleted, or modified, the content management system can record each change to the content library as a separate content entry in a server content journal associated with the content library. Each time the content library is accessed from a client device, the client device can request that any new content entries recorded since the last time the content library was accessed by the client device be processed to update the content library on the client device. Thus, the content library is synchronized to indicate any changes made to the content library from a different client device.

To insure that only new content entries are processed when the content library is accessed by a client device, the content management system can be configured to store synchronization data on the client device including a content library identifier identifying the content library to be synchronized and a server content journal number identifying the content entry in the server content journal last processed by the client device. Thus any content entries created after the content entry identified by the server content journal number can be processed to synchronize the content library on the client device with the content library on the content management system.

An example system configuration 100 is shown in FIG. 1, wherein electronic devices communicate via a network for purposes of managing a synchronized content library across multiple client devices. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., one or more servers) through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with content management system 106 via a client-side application integrated with the content item system or via a webpage displayed using a web browser application.

Content management system 106 can make it possible for a user to synchronize a content library between content management system 106 and client devices 102. Further, the content management system can make it possible for the user to perform a variety of content management tasks, such as retrieve, modify, browse, and/or share the content items. For example, client device $102_i$ can upload content items to content management system 106 via network 104. The content items can later be retrieved or modified from content management system 106 using the same client device $102_i$ or some other client device 102.

To access the various content management services, content management system 106 can be configured to enable a user to create a user account with the content management system 106. For example, content management system 106 can include an account management module 124 configured to prompt a user to enter account information to create a new user account. Account information can include any variety of information about the user including a user's name, address, phone number age, etc. In some embodiments, the only account information necessary to create a user account can be a user name and password.

Account management module 124 can be configured to create a new user account using received account information. This can include communicating with a user account database 150 configured to store user account profiles for registered users. Account management module 124 can be configured to create a new user account profile in user account database 150 using the received account information.

Further, account management module 124 can be configured to generate a unique content library identifier associated with the newly created account and store the content library identifier in the user account profile. The content library identifier can be used to identify content items as part of the user's content library. This concept is described in further detail below.

A user account profile can also include account management information, such as account type, e.g. free or paid; usage information, e.g. content item edit history; maximum storage space authorized; storage space used; content storage locations; security settings; personal configuration settings; content sharing data; etc.

The user account enables a user to store content items, such as documents, text content items, audio content items, video content items, etc., from client devices 102 authorized on the user account. The content can include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio content items and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from client devices 102. The synchronization can be platform agnostic. That is, the content can be synchronized across multiple client devices 102 of varying type, capabilities, operating systems, etc. For example, client device $102_i$ can include client software, which synchronizes, via synchronization module 132 at content management system 106, content in client device $102_i$'s content item system with the content in an associated user account. In some cases, the client software can synchronize any changes to content in a designated folder and its sub-folders, such as new, deleted, modified, copied, or moved content items. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for content item changes and queue those changes for later synchronization to content management system 106 when a network connection is available. Similarly, a user can manually stop or pause synchronization with content management system 106.

A user can also view or manipulate content items via a web interface generated and served by user interface module 122. For example, the user can navigate in a web browser to a web address provided by content management system 106. Changes or updates to content in content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of client devices 102.

Content management system 106 can include communications interface 120 for interfacing with various client devices 102, and can interact with other content and/or service providers $109_1, 109_2, \ldots, 109_n$ (collectively "109") through an Application Programming Interface (API). Certain software applications can access content storage 160 through an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 that can track and report on aggregate content item operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. For example, sharing module 130 can generate a custom network address, such as a uniform resource locator (URL), which allows any web browser to access shared content in content management module 106 without any authentication. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

Content management system 106 can include content management module 128 configured to create and update a server content journal used to manage a content library and synchronize the content library between content management system 106 and client devices 102. A server content journal can be a list of content entries, each associated with a content item in the content library. Each content entry can include information used to identify the content item and describe the current state of the content item, including the location of the content item, the name and content item hierarchy of the content item and the content library to which the content item belongs.

Content management module 128 can be configured to add a new content entry to the server content journal for each content item added to the content library. For example, content management module 128 can be configured to receive input indicating that a new content item has been added to the content library and, in response to the input, create a new content entry associated with the new content item added to the content library.

In some embodiments, content management module 128 can be configured to modify an existing content entry associated with a content item upon a user making a change to the content item, such as changing the content items name, location, content, etc. For example, content management module 128 can be configured to access the content entry associated with the content item and modify the content entry to reflect the change made to the content item.

In some embodiments, content management module 128 can be configured to create a new content entry for every change that occurs in regards to the content library. Each content entry, therefore, can represent an addition, deletion or modification of a content item. Therefore, multiple content entries can be associated with a single content item, however only one content entry can indicate the latest state of the content item in the content library.

Thus, if a content item in the content library is changed to give the content item a new name, content management module 128 can create a new content entry associated with the same content item that indicates the modified current state of the content item, i.e. the new name. The changed content item can thus be associated with two content entries, the old content entry indicating the original name of the content item and the new content entry indicating the new name of the content item.

In some embodiments, content management module 128 can be configured to delete the old content entry upon creating a new content entry associated with the content item. In some embodiments, however, content management module 128 can be configured to keep the old content entry and the new content entry associated with the content item. This allows a history of the content library to be maintained for recording purposes.

In embodiments where old content entries are not deleted, content management module 128 can be configured to mark the new content entry as being the latest content entry associated with the content item and mark the old content entry as no longer being the latest content entry associated with the content item. For example, each content entry can include a latest flag indicating whether the content entry is the latest content entry associated with a content item and content management module 128 can be configured to modify the latest flag associated with a content entry accordingly.

FIG. 2 shows an example server content journal including three content entries. Each content entry includes 9 data fields: a content pointer, content library identifier, server content journal number, content path, latest flag, directory flag, content size, shared flag and moved identifier.

The content pointer can be used to identify the location of the content item in content storage 160. For example, the content pointer can include the exact storage address of the content item in content storage 160. In some embodiments, the content pointer can point to multiple locations in content storage 160, each of which contains a portion of the content item.

As shown, the content pointer of the first content entry has a value of 0001 indicating that the content item associated with the content entry is located at memory location 0001. The content pointer for the second content entry has a null value. This can be because the content item associated with the second content entry is a directory and thus is not associated with a content item stored in the content storage. The content pointer of the third content entry has a value of 1002 indicating that the content pointer associated with the third content entry is located at memory location 1002.

The content library identifier can identify the content library to which the content item is associated. The content library identifier can also be used to manage access to the content item. For example, only user accounts associated with the content library identifier can be allowed access to the content item. As shown, each of the three content entries is associated with the same content library identifier '178' indicating that the three content entries are all part of the same content library.

In some embodiments, the server content journal can include content entries associated with various content library identifiers such that the content entries in the server content journal are not all associated with the same content library. In some embodiments, a unique server content journal can be maintained for each content library such that each entry in the server content journal is associated with the same content library identifier and thus the same content library.

The server content journal number can be a unique number identifying each content entry in the server content journal. In some embodiments, the server content journal number can also indicate an order in which the content entries are added to the server content journal. For example, the server content journal number assigned to the first content entry added to the server content journal can be one and the server content journal number can be incremented for each new content entry added to the server content journal. In some embodiments, new content entries can be added to the bottom of the server content journal. An example of this is shown in FIG. 2, where the server content journal number for the first content entry is one, the server content journal number of the second content entry is two and the server content journal number of the third content entry is three.

The content path can identify the name of the content item as well as a folder hierarchy associated with the content item. For example, the content path can include a folder or path of folders in which the content item is placed as well as the name of the content item. As shown in FIG. 2, the content path of the first content entry is /ReadMe.txt. This indicates that the content item is named ReadMe.txt and the content item is located in the root folder.

The content path of the third content entry is /Photos/Face.jpeg. This can indicate that the content item is named Face.jpeg and the content item is located in the Photos folder, which is located in the root folder.

A client device can use the content path to present the content items in the content library in the appropriate folder hierarchy. A client device can use the content path to move a content item (e.g., a content item) in the content library from one directory to another directory in the folder hierarchy.

The latest flag can indicate whether the content entry is the latest content entry associated with the content item. For example, the latest flag can be a Boolean value set to true or one to indicate that the content entry is the latest content entry associated with the content item. The latest flag can be set to false or zero to indicate that the content entry is not the latest content entry associated with the content item.

This can be useful in embodiments where the content management system is configured to keep the old content entry associated with a content item upon creating a new content entry associated with the content item. For example, content management module 128 can be configured to set the latest flag to true or one when creating a new content entry. The content management system can be further configured to change the latest flag of the old content entry associated with the content item to false or zero to indicate that the old content entry is not the latest content entry associated with the content item.

The directory flag can indicate whether the content item is a directory or folder. For example, the directory flag can be a Boolean value that can be set to true or one to indicate that the content item is a directory. Alternatively, the directory flag can be set to false or zero to indicate that the content item is not a directory. As shown in FIG. 2, the first and second content entries have a directory flag value of false indicating that the content items associated with the first and third content entries, respectively, are not directories. The second content entry has a directory flag set to true, indicating that the content item associated with the second content entry is a directory.

The content size can indicate the size of the content item associated with the content entry. For example, the size can indicate the size of the content item in kilobytes. As shown, the first content entry has a content size of 85 indicating that the content item associated with the first content item has a size of 85 kilobytes. The second content entry has a content size of 0. This is because the second content entry is a directory, as indicated by the directory flag, and thus has no size.

In some embodiments, the content size can be used to indicate that a content item has been deleted from a content library. For example, content management module 128 can be configured to set the content size to a negative value to indicate that the content item has been deleted.

The shared flag can indicate whether the content item is currently shared with other users. For example, the user/owner of the content library can elect to share content items in the content library with other users. The owner of the content library can generate a link (e.g., URL, content item path, etc.) for a content item that can be embedded in an electronic message that allows another user to access the linked content item. The other user can access the shared and/or linked content items using a web browser or client application, for example. When the user shares a content item, the shared flag for the content item entry in the server content journal can be updated to "true" to indicate that the content item has been shared. If the content item is not shared or is no longer shared, the shared flag can be set to "false."

The moved identifier can indicate whether a deleted content entry is part of a content item move operation. For example, to move a content item from one directory (e.g., origination) of the content library to another directory (e.g., destination) of the content library, the content item is deleted from the originating directory and added to the destination directory. The moved identifier provides a mechanism for associating a delete entry and an add entry in the server content journal so that a move operation can be identified. For example, if a content item has not been moved, the server content journal entry for the content item can have the moved flag set to a negative value (e.g., −1). If a content item has been moved, then the delete entry and corresponding add entry can be assigned the same moved identifier value (e.g., a non-negative value, a hash value generated from the timestamp corresponding to the content item move, a hash value generated from the content item itself). Thus, the moved identifier for the delete entry can be used to find the corresponding add entry for the content item. The moved identifier can be used to optimize the synchronization process by allowing client devices to simply move content items rather than deleting the content item and then downloading the same content item from the server as part of an add content item operation.

FIG. 3 shows an example of using the content size to indicate that a content item has been deleted from a content library. As shown, the server content journal includes the same entries as shown in FIG. 2, as well as a fourth, fifth and sixth entry. The fourth content entry is associated with the same content item as the third content entry. This is indicated by the fourth content entry having the same content pointer (1002) and content path (/Photos/Face.jpg) as the third content entry.

As shown, the content size of the fourth content entry is −1, which indicates that the content item "Face.jpg" has been deleted. Further, the "latest flag" state associated with the third content entry has been changed to false to indicate that the third content entry is no longer the latest content entry for the content item Face.jpg. As shown, the content pointer of the fourth content entry has not been changed even though the content item has been deleted from the content library. This is because in some embodiments the content item can remain in the content storage when the content item is deleted from the content library. This can allow the content item to be recovered if necessary, for example, if the content item was deleted by accident.

In some embodiments, the content management system can delete the content item from the content storage when the content item is deleted from the content library. The content management system can set the content pointer to null in the content entry to indicate that the content item was deleted. Thus, in this type of embodiment, the content pointer of the fourth content entry would be set to null rather than retain the value of a location in the content storage.

In some embodiments, the content item can be maintained in the content storage for a limited time after deletion and then be removed from the content storage. This allows a limited time for the content item to be recovered after being deleted from the content library.

In some embodiments, a content item can be deleted as part of a content item move operation. For example, a content item that was deleted as part of a content item move operation can be identified using the moved identifier field. A non-negative move identifier can be used to identify delete and add content entries that are part of the same move operation. For example, the delete and add content entries that are part of the same move operation will have the same moved identifier. Thus, because journal entry number 4 and journal entry number 6 have the same moved identifier, the delete journal entry number 4 and the add journal entry number 6 are both part of the same move operation. Therefore, when a client receives journal entry number 4 followed by journal entry number 6, the client can simply move the content item "Face.jpg" from the content path of entry 4 to the content path of entry 6 without deleting and downloading the "Face.jpg" content item from the content management system.

Figure 4:
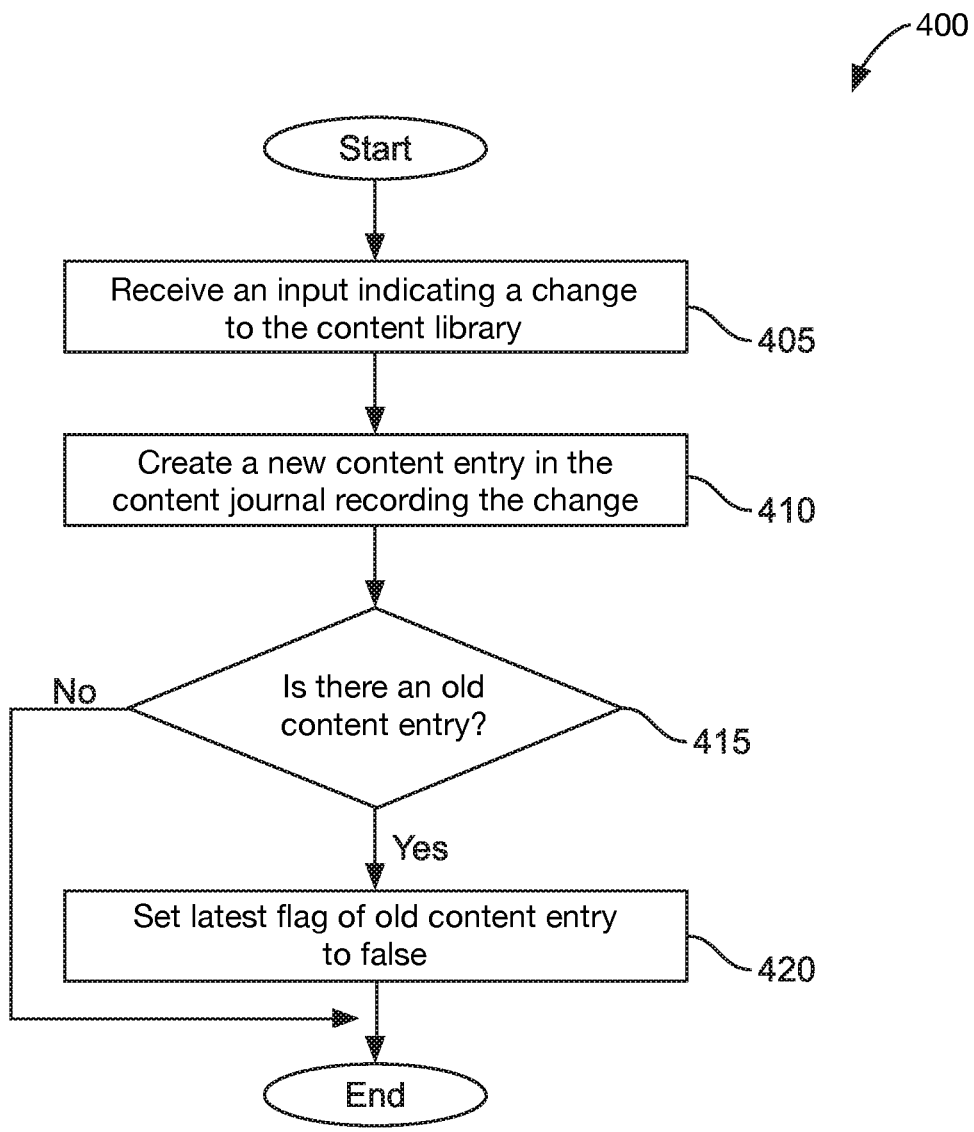
FIG. 4 shows an example method for creating a server content journal.

FIG. 4 shows an example method 400 for creating a server content journal. Method 400 begins at block 405, where a change input indicating a change to a content library is received by the content management system. The change input can include an addition or deletion of a content item to the content library or a modification of a content item in the content library.

Upon receiving the change input, the method continues to block 410 where a new content entry recording the change to the content library is added to the server content journal. In some embodiments, the server content journal can be associated with a single content library such that all entries in the content library are recording changes made to the same content library. In some embodiments, the content management system can record changes to multiple content libraries in the content management system.

The new content entry can include information describing the content item associated with the change input. For example, the new content entry can include a content library identifier that identifies the content library to which the content item belongs, the name and content item hierarchy of the content item in the content library, a location of the content item in memory, etc. The new content entry can also include a server content journal number indicating the sequential position in which the new content entry was added to the server content journal. For example, if the server content journal included 5 content entries prior to the new content entry being added to the server content journal, the new content entry can have a server content journal number of 6 to indicate that it is the 6$^{th}$ content entry added to the server content journal.

In embodiments in which the server content journal is not exclusive to a single content library, the server content journal number can indicate the sequential position in which the new content entry was added to the server content journal in regards to the content library to which the content item belongs. For example, a content entry that is the 7$^{th}$ content entry added to the server content journal but only the 3$^{rd}$ content entry added to the server content journal in regards to a specific content library, can be given a server content journal number of 3 to indicate that it is the third content entry in the server content journal added in relation to the specific content library.

Further, the new content entry can also include a latest flag that is set to indicate that the new content entry is the latest content entry associated with the content item, i.e. no other content entry associated with the content item been created after the new content entry. In some embodiments, the latest flag can be a Boolean variable set to true to indicate that the new content entry is the latest content entry associated with the content item.

Upon creating the new content entry, the method continues to block 415 where the content management system can determine if there is an old content entry in the server content journal that corresponds to the content item associated with the new content entry. An old content entry can be any content entry in the server content journal, other than the new content entry, that is associated with the same content item as the new content entry.

If an old content entry associated with the content item does exist, the method continues to block 420 where the content management system can set the latest flag of the old content entry to indicate that the old content entry is not the latest content entry in the server content journal associated with the content item. For example, the latest flag can be a Boolean value set to false to indicate that the old content entry is not the latest content entry associated with the content item. The method then ends. Likewise, if at block 415 it is determined that there is no old content entry associated with the content item, the method ends.

Returning to the discussion of FIG. 1, content management system 106 can be configured to use the server content journal to synchronize the content library between content management system 106 and client devices 102. For example, client device 102$_i$, can be configured to transmit a synchronization request to the content management system requesting that the content library on client device 102$_i$ be synchronized with the content library stored on content management system 106. The synchronization request can include synchronization data including a content library identifier and a server content journal number used by content management system 106 to identify server content journal entries representing changes to the content library that are unknown to client device 102$_i$ and have thus not been made to the content library on client device 102$_i$. Further, content management system 106 can send synchronization commands to client device 102$_i$ instructing client device 102$_i$ to make the appropriate changes to the content library on client device 102$_i$. Content management system 106 can further transmit updated synchronization data to client device 102$_i$ that reflects the completed synchronization.

Figure 5:
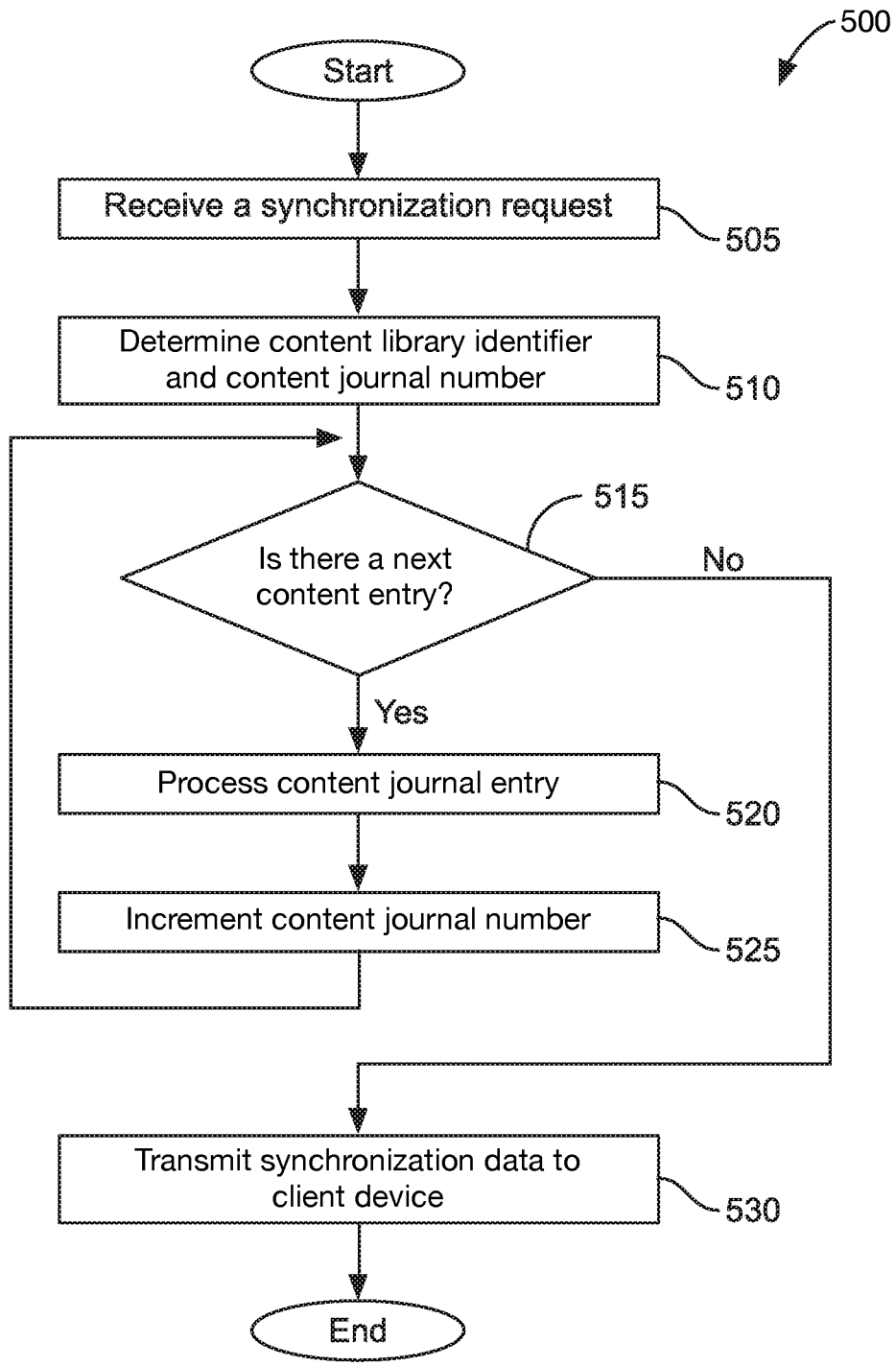
FIG. 5 shows an example method for synchronizing a content library between the content management system and a client device.
Figure 6:
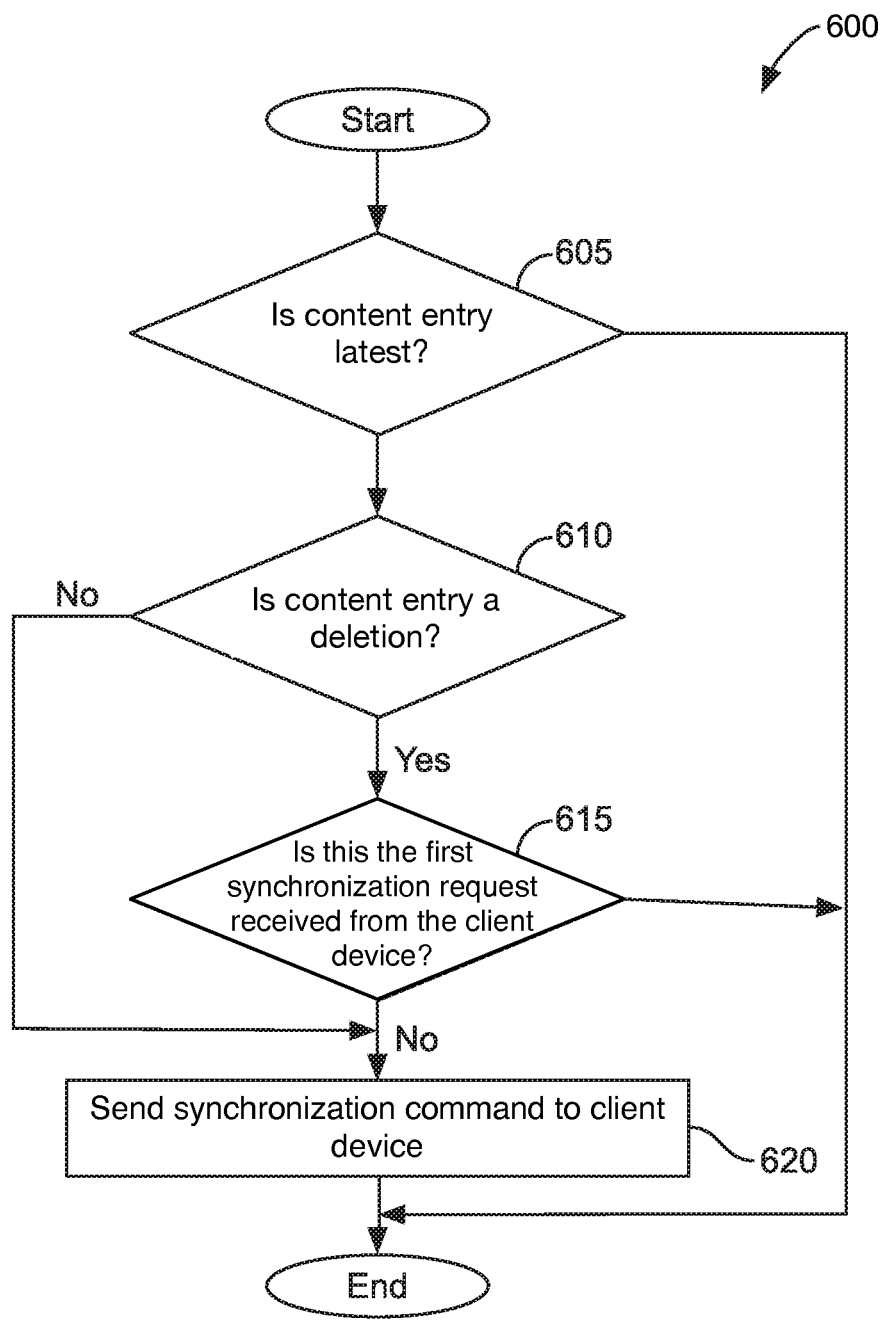
FIG. 6 shows an example method for processing a content entry.

Using the server content journal to synchronize the content library on client device 102$_i$ with the content library on content management system 106 is discussed in further detail in FIGS. 5 and 6, which are discussed in view of FIG. 1.

FIG. 5 shows an example method 500 for synchronizing a content library between content management system 106 and client device 102$_i$. Method 500 begins at block 505, where content management system 106 receives a synchronization request. In some embodiments, the synchronization request can be a request originating from a client application on client device 102$_i$ to synchronize the content library on client device 102$_i$ with the content library on content management system 106.

In some embodiments, the synchronization request can include synchronization data identifying the content library and a position in the server content journal. For example, content management system 106 can maintain a server content journal that records changes made to the content library. Changes to the content library can include adding content items to the content library, deleting content items from the content library, and modifying content items in the content library. A new content entry can be added to the server content journal for each change made to the content library. For example, content entries can be added to the server content journal as described in FIG. 4.

The synchronization data included in the synchronization request can thus include a content library identifier and a server content journal number, as described in FIG. 4. The content library identifier can identify a content library to be synchronized on client device 102$_i$ and the server content journal number can be a sequential position in the server content journal associated with the content library that represents the latest state of the content library known to client device 102$_i$ and to which client device 102$_i$ has been previously synchronized. For example, the content entry identified by the server content journal number can indicate the most recent change to the content library that the content library on client device 102$_i$ has been updated to reflect.

Thus the server content journal number received in the synchronization request indicates a portion of the server content journal that represents a state of the content library that is already known to client device 102$_i$ and that the content library on client device 102$_i$ has been synchronized to reflect. The server content journal number received in the synchronization request can also be used to identify a portion of the server content journal that represents changes to the content library unknown to client device 102$_i$ and that the content library on client device 102$_i$ has not been synchronized to reflect. For example, the content entry identified by the server content journal number can represent the content entry last processed by client device 102$_i$ as a result of the previous synchronization request made by client device 102$_i$. Thus, all content entries added to the server content journal prior to the content entry identified by the server content journal number, represent changes known to client device 102$_i$ and that have already been synchronized on client device 102$_i$. Further, all content entries added to the server content journal after the content entry identified by the server content journal number, represent changes that occurred after the previous synchronization request made by client device 102$_i$.

In some embodiments, the synchronization data can be received in an encoded format. For example, it may be beneficial to provide limited information to client device 102$_i$ about how the content library is maintained by content management system 106. In view of this goal, the synchronization data stored on client device $102_i$ can be in an encoded format such that the content library identifier and the server content journal number included in the synchronization data cannot be accessed by client device $102_i$. For example, in some embodiments, the synchronization data can be received as an opaque data type such as an opaque data string.

Upon receiving the synchronization request, the method continues to block 510 where content management system 106 can determine the content library identifier and server content journal position included in the synchronization request. For example, content management system 106 can decode the received synchronization data to determine the content library identifier and the server content journal position.

The method then continues to block 515 where content management system 106 can determine if there is a next content entry in the server content journal in sequential order after the content entry identified by the server content journal number. For example, if the server content journal number is 5, content management system 106 can determine if there is a server content journal entry with a server content journal number of 6.

If content management system 106 determines that there is a server content journal entry after the content entry identified by the server content journal number, the method continues to block 520 where content management system 106 can process the next server content journal entry. This is described in further detail in FIG. 6.

Upon content management system 106 processing the next content entry, the method continues to block 525 where content management system 106 can increment the server content journal number to indicate that the previously unprocessed server content journal entry has been processed. For example, the server content journal number can be incremented to identify the server content journal entry that was processed in step 520. Thus the incremented server content journal number indicates the updated portion of the server content journal entry synchronized with the client device.

The method then returns to block 515 where content management system 106 can determine whether there is a next content entry that has not been synchronized based on the incremented server content journal number.

If at block 515 content management system 106 determines that there is no next content entry, and thus all the content entries associated with the content library in the server content journal have been synchronized with client device $102_i$, the method continues to block 530 where content management system 106 can transmit updated synchronization data to client device $102_i$. For example, the content library identifier and an updated server content journal number indicating the final content entry synchronized with client device $102_i$ can be transmitted to client device $102_i$. In some embodiments, content management system 106 can encode the synchronization data prior to transmitting the synchronization data to client device $102_i$ so that client device $102_i$ cannot access the content library identifier and the server content journal number.

In some embodiments, the synchronization request received at block 505 can include multiple content library identifiers and a server content journal position associated with each content library identifier. For example, a user can include multiple content libraries associated with their user account, such as a personal content library and a shared content library. The different content libraries can each be associated with a unique content library identifier and the synchronization data can include a content library identifier and a server content journal number for each content library.

In this type of embodiment, content management system 106 can repeat method steps 510 through 530 for each content library identified by a content library identifier included in the synchronization request. Further, in some embodiments, the synchronization data transmitted to client device $102_i$ in step 530 can include the content library identifier and the associated updated server content journal number for each content library identified by a content library identifier included in the synchronization request received at step 505.

FIG. 6 shows an example method 600 for processing a content entry as shown in block 520 of FIG. 5. As shown in FIG. 6, method 600 begins at block 605 where content management system 106 determines whether the content entry is the latest content entry associated with the content item. For example, content management system 106 can use the latest flag associated with the content entry to determine if the content entry is the latest content entry associated with the content item. If the latest flag indicates that the content entry is the latest content entry associated with the content item, the method continues to block 610. If, at block 605, content management system 106 determines that the content entry is not the latest content entry associated with the content item, the method ends.

At block 610 content management system 106 determines whether the content entry represents a deletion to a content item in the content library. In some embodiments, a content size variable representing the size of the content item associated with the content entry can be set to a negative number to indicate that the content item has been deleted from the content library. Alternatively, in some embodiments, the content entry can include a delete flag indicating whether the content entry represents a deletion of a content item. For example, the delete flag can be a Boolean variable that can be set to true to indicate that the content entry is a deletion of a content item, or the Boolean variable can be set to false to indicate that the content entry is not a deletion.

If, at block 610, content management system 106 determines that the content entry is a deletion, the method continues to block 615 where content management system 106 determines whether the synchronization request received from client device $102_i$ is the first synchronization request received from client device $102_i$. In some embodiments, the server content journal number received with the synchronization request can be used by content management system 106 to determine if the synchronization request is the first synchronization request received from client device $102_i$. For example, if the server content journal number identifies the first content entry added to the server content journal, content management system 106 can determine that the synchronization request is the first synchronization request received from client device $102_i$. Alternatively, in some embodiments, content management system 106 can maintain a record of the synchronization requests received from client device $102_i$ and can check the record to determine if the synchronization request is the first synchronization request received from client device $102_i$.

If content management system 106 determines that the synchronization request is not the first synchronization request received from client device $102_i$, the method continues to block 620 wherein content management system 106 sends a synchronization command to client device $102_i$ based on the content entry. A synchronization command can include data from the content entry that can be used by client device $102_i$ to make the change to the content library on client device $102_j$. The method then ends.

If, at block 615, content management system 106 determines that the synchronization request is the first synchronization request received from client device $102_j$, the method ends without sending the synchronization command to client device $102_j$. This is because, based on the fact that a synchronization request has not been received from client device $102_j$, content management system 106 can determine that the content item deleted by the content entry has not been previously added to the content library on client device $102_j$. Thus sending a synchronization command to delete the content item would be an unnecessary step.

If, at block 610, content management system 106 determines that the content entry does not represent a deletion, the method continues to block 620 where content management system 106 sends a synchronization command to client device $102_i$ based on the content entry. The method then ends.

In some embodiments, client device $102_i$ can maintain a local content journal for content library content stored on client device $102_i$. For example, each time content management system 106 sends a content entry in response to the synchronization request indicating content items to add or delete (including server content journal data fields), client $102_i$ can add a corresponding content entry to a local content journal that contains metadata for each content item. The local content journal for client device $102_i$ can be similar to the server content journal. For example, the metadata can include the same nine data fields stored in the server content journal for each content entry. The metadata for each entry can include, for example, a content pointer, content library identifier, a journal number, content path, a latest flag, a directory flag, a content size, a shared flag and/or a moved identifier, as described above.

Figure 7:
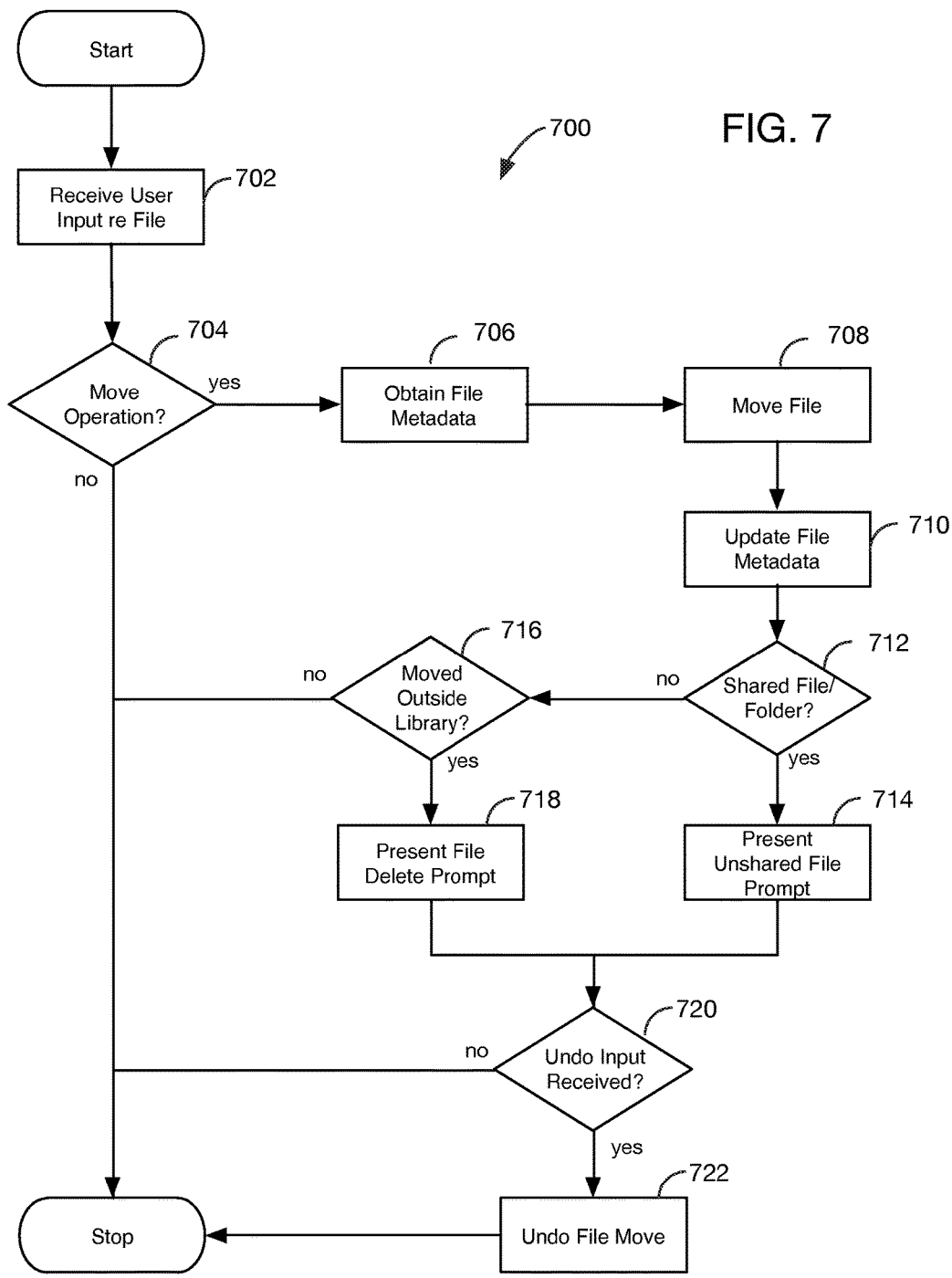
FIG. 7 shows an example method for prompting a user to undo a content item operation at a client device.

FIG. 7 shows an example method 700 for prompting a user to undo a content item operation at a client device. For example, method 700 can be performed by client device $102_i$ when a user attempts to move a content item associated with the content library stored on client device $102_i$. Referring to FIG. 7, at block 702, client device $102_i$ can receive user input with respect to a content item associated with the content library. For example, a user of client device $102_i$ can select a content item in the content library stored on client device $102_i$ and provide additional input (e.g., drag and drop) to move the content item from the current (e.g., origination) directory to a destination directory. The content item can be moved to a destination location (e.g., folder, directory, etc.) within the content library. The content item can be moved to a destination directory outside of the content library.

At block 704, client device $102_i$ can determine if the content item operation is a content item move operation. If the content item operation is not a move operation, then the method can end at block 704. If the content item operation is a move operation, then the method can continue at block 706.

At block 706, client device $102_i$ can obtain content item metadata for the selected content item. For example, client device $102_i$ can obtain the content item metadata from the local content journal by looking up the last journal entry (e.g., highest number journal entry) associated with the path of the content item (e.g., /Photos/Face.jpg). The metadata for the content item can include, for example, a shared flag that indicates if the selected content item has been shared (e.g., by adjusting content item permissions to allow sharing, by creating a link to the content item and sharing the link, etc.).

At block 708, client device $102_i$ can move the content item to the location designated by the user during the move input. For example, the content item can be moved to the location (e.g., folder) indicated by the user during a cut-and-paste operation, a drag-and-drop operation or any other move operation.

At block 710, client device $102_i$ can update the content item metadata in the local content journal. For example, client device $102_i$ can update the local content journal by adding a journal entry for the new location of the moved content item. For example, client device $102_i$ can add a local journal entry that includes the updated location of the content item in the content path field of the entry.

At block 712, client device $102_i$ can determine whether the moved content item is a shared content item. For example, client device $102_i$ can use the shared flag in the content item metadata obtained at block 706 to determine if the moved content item is a shared content item.

If the content item is a shared content item, then at block 714 client device $102_i$ can present the user with an unshared content item prompt (e.g., popup window, bubble dialog, other graphical user interface, etc.) that informs the user that the user is moving a shared content item and that the content item will no longer be accessible to other users after the content item has been moved. In some implementations, the prompt can include a graphical element (e.g., a link, button, etc.) that the user can select to undo the content item move operation.

If the content item is not a shared content item, then at block 716 the client device can determine if the content item has been moved out of the content library. For example, client device $102_i$ can determine whether the content item has been moved into a destination directory that is not associated with the content library. If the content item has not been moved out of the content library, then the method ends at block 716.

If the content item has been moved out of the content library, then at block 718 the client device can present a content item deletion prompt that informs the user that moving the content item out of the content library will cause the content item to be deleted from the content library. For example, even though the content item has been moved to another directory on the client device, moving the content item out of the content library will delete the content item from the content library on the client device and delete the content item from the content library on other client devices that share (e.g., synchronize with) the same content library. In some implementations, the prompt can include a graphical element (e.g., a link, button, etc.) that the user can select to undo the content item move operation.

At block 720, client device $102_i$ can determine if the client device has received an undo input. For example, the user can provide the undo input by selecting the undo graphical element presented on the unshared content item prompt or the content item delete prompt, described above. For example, the user can select the undo graphical element to cause the client device to return the moved content item to the origination directory. If the user does not select the undo graphical element, the method ends at block 720.

If the user does select the undo graphical element, the content item move operation can be undone at block 722. For example, client device $102_i$ can return the moved content item to the origination directory and delete the local content item journal entry made at block 710.

Figure 8:
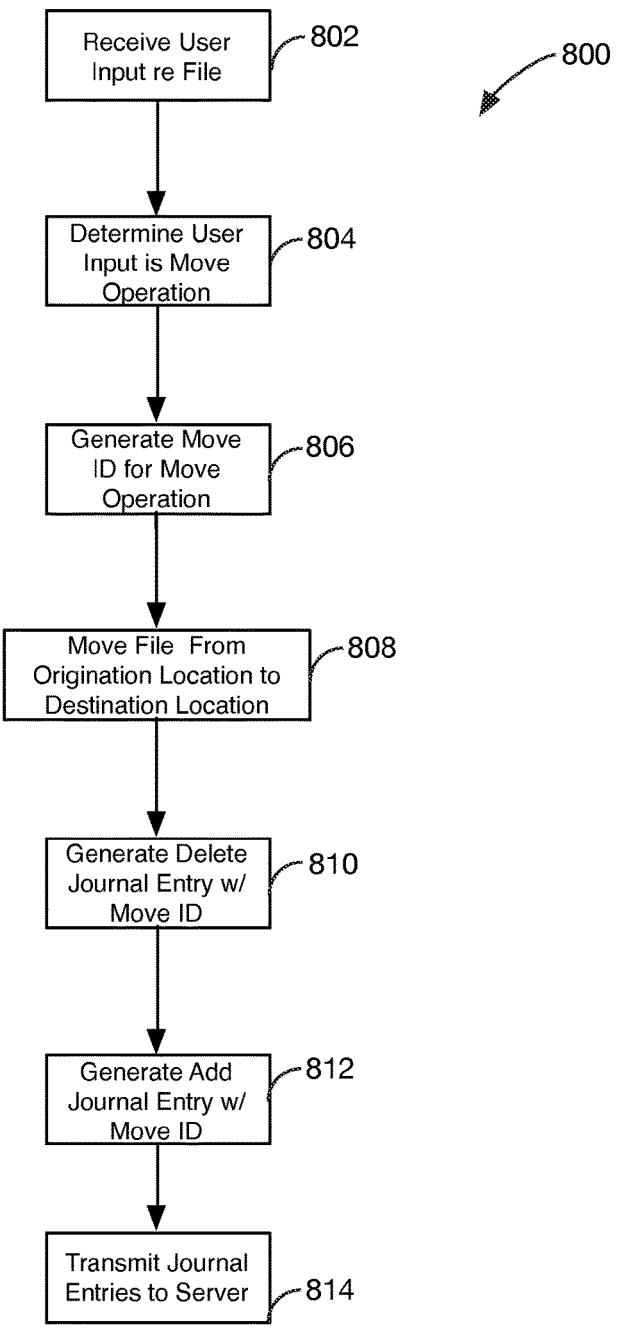
FIG. 8 shows an example method for generating content journal entries for a move operation.

FIG. 8 shows an example method 800 for generating content journal entries for a move operation. For example, client device $102_i$ can generate content journal entries when a user provides input to move a content item from an origination location to a destination location on the client device.

At block 802, client device $102_i$ can receive user input with respect to a content item stored on the client device. For example, the content item stored on client device $102_i$ can be included in or associated with a content library on client device $102_i$.

At block 804, client device $102_i$ can determine that the user input is associated with a move operation. The user input can correspond to a cut-and-paste content item operation. The user input can correspond to a drag-and-drop content item operation. For example, the user can select and drag the content item from the origination location (e.g., directory, folder, etc.) and drop the content item into the destination location (e.g., directory, folder, etc.). Client device $102_i$ can determine that the user input is associated with a move operation by comparing the origination location to the destination location and determining that the locations are different, for example.

At block 806, client device $102_i$ can generate a move identifier for the move operation. For example, the move identifier can be generated based on a timestamp generated at the time that the move input is received. The move identifier can be a hash value generated based on the timestamp, for example.

At block 808, client device $102_i$ can move the content item from the origination location to the destination location.

At block 810, client device $102_i$ can generate a delete content item content journal entry to the local content journal. For example, client device $102_i$ can generate a new content journal entry for the moved content item that specifies the origination location (e.g., content path) and a negative size (e.g., content size=−1). The new content item journal entry can also include the move identifier generated at block 806.

At block 812, client device $102_i$ can generate an add content item content journal entry to the local content journal. For example, client device $102_i$ can generate a new content journal entry for the moved content item that specifies the destination location (e.g., content path) and the actual content item size (e.g., content size=content item size). The new content item journal entry can also include the move identifier generated at block 806.

At block 814, client device $102_i$ can transmit the new content journal entries to the content management system servers. For example, client device $102_i$ can transmit the new journal entries to content management system 106 so that the new content entries can be added to the server content journal.

Figure 9:
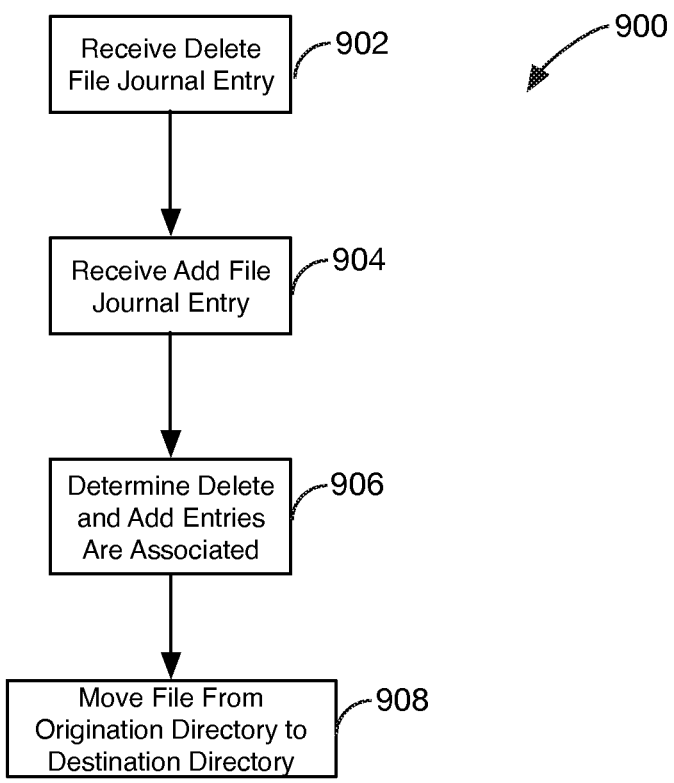
FIG. 9 shows an example method for processing content journal entries for a content item move operation.

FIG. 9 shows an example method 900 for processing content journal entries for a content item move operation. For example, a client device, such as client device 102*i*, can perform method 900 to move a content item associated with a content library that is synchronized between multiple client devices using content management system 106.

At block 902, client device $102_i$ can receive a delete content item content journal entry. For example, client device $102_i$ can receive a content journal entry for a content item having a negative size (e.g., content size=−1). The content journal entry can specify a location of the content item (e.g., content path, origination location). The content journal entry can include a non-negative move identifier indicating that the delete content item content journal entry is associated with a move operation.

At block 904, client device $102_i$ can receive an add content item content journal entry. For example, client device $102_i$ can receive a content journal entry for a content item having a non-negative size (e.g., content size=824). The content journal entry can specify a location of the content item (e.g., content path, destination location). The content journal entry can include a non-negative move identifier indicating that the add content item content journal entry is associated with a move operation.

At block 906, client device $102_i$ can determine that the delete and add content journal entries are associated. For example, client device $102_i$ can compare the move identifier associated with the content journal entry received at block 902 with the move identifier associated with the content journal entry received at block 904 to determine whether the content journal entries are both part of the same move operation. When the move identifiers are the same, the client device can determine that the content journal entries are associated with the same move operation.

At block 908, client device $102_i$ can move the content item identified in the content journal entry (e.g., delete entry) received at block 902 to the destination location specified by the content journal entry (e.g., add entry) received at block 904. Thus, client device $102_i$ can move the content item associated with the content journal entries without having to download the content item from content management system 106 servers.

Figure 10:
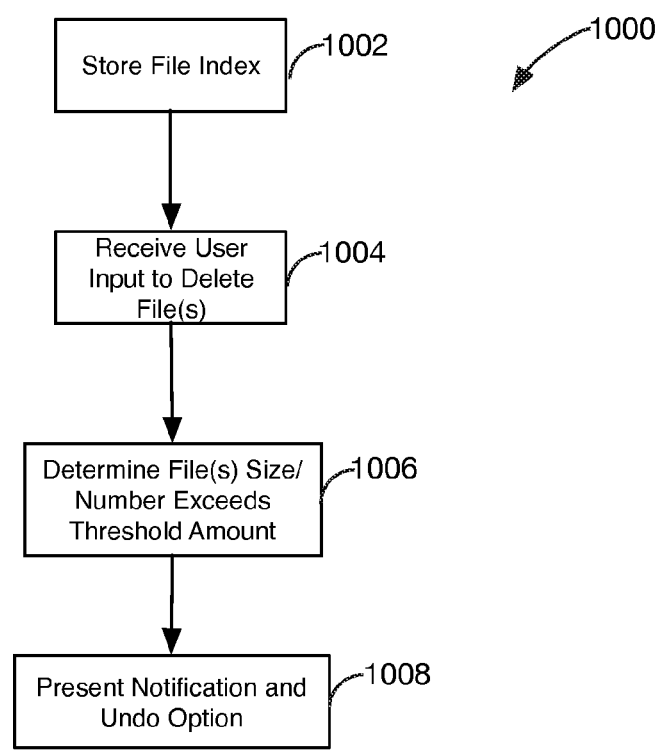
FIG. 10 shows an example method for prompting the user to undo a content item deletion operation.

FIG. 10 shows an example method 1000 for prompting the user to undo a content item deletion operation. For example, a prompt can be presented to the user to undo a content item deletion operation when the collective size or number of content items to be deleted exceeds a threshold size or number of content items.

At step 1002, client device $102_i$ can store an index of content items. For example, client device $102_i$ can maintain an index content item that includes every content item in the content library, each content item's location (e.g., directory and client device) and each content item's size. The index content item can also include information that indicates the maximum allowable size for the user's content library (e.g., the maximum storage size allocated to the user) and/or the current size of (e.g., total amount of data stored in) the user's content library.

At step 1004, client device $102_i$ can receive user input for deleting one or more content items associated with the content library and stored on client device $102_i$. For example, the user can select one or more content items associated with the content library and provide input to delete the selected content items.

At step 1006, client device $102_i$ can determine that the size or number of content items exceeds a threshold size or number. For example, when the user attempts to delete the selected content items from the content library, client device $102_i$ can determine the collective size of the selected content items and can compare the collective size of the content items to the total size of the content library or the maximum allowable size of the content library. Client device $102_i$ can determine that the collective size of the content items to be deleted exceeds a predetermined threshold percentage (e.g., 10%, 70%, 90%, etc.) of the content library size, or the maximum allowable size of the content library.

Alternatively, when the user attempts to delete the selected content items from the content library, client device $102_i$ can determine the number of selected content items and can compare the number of selected content items to the total number of content items in the content library. Client device $102_i$ can determine that the number of selected content items to be deleted exceeds a predetermined threshold percentage (e.g., 10%, 70%, 90%, etc.) of the total number of content items in the content library.

In some implementations, the user can be warned when a threshold percentage of a particular type of content item is deleted. For example, a notification can be presented to the user when the user attempts to delete more than a threshold percentage (e.g., 10%, 40%, 70%, etc. of the total size or total number) of the of a particular content item type (e.g., music content item, video content item, etc.) in the content library. The notification can include a user-selectable option to undo the delete operation.

At step 1008, client device $102_i$ can present a notification and an undo option on a display of client device $102_i$. For example, the user can be warned when the user attempts to delete a threshold number or threshold size of content items. For example, a notification can be presented to the user when the user attempts to delete more than a threshold percentage (e.g., 10%, 40%, 70%, etc.) of the number of content items in the content library or a threshold percentage of the number of content items in the content library stored on the client device. The notification can include a user-selectable option to undo the delete operation. For example, when the user is notified that a content item delete threshold (e.g., threshold number, threshold size, threshold percentage, etc.) has been exceeded, the user can be prompted (e.g., in the notification) to undo the content item delete operation. The user can select a graphical element in the notification to cause the content item delete operation to be undone.

In some implementations, the index of content items stored on each device (e.g., smartphone and laptop) can indicate which content library content items are stored on which client device. For example, each client device can store a portion of the content library and the stored portion can be different on each client device. When a user attempts to delete a number of content library content items from one of the devices (e.g., the smartphone) that exceed a threshold number (e.g., percentage of total number on the smartphone) or that exceed a threshold size (e.g., percentage of total size on the smartphone), then the device can present a notification that warns the user that the deletion will remove more than the threshold number or size of content items on the device. The notification can include an option that when selected by the user will undo the content item deletion operation.

In some implementations, client device $102_i$ can present a notification when the user attempts to delete content items that will cause the removal of content library content items on another device. For example, a user can delete content library content items stored on a laptop device that are also shared with and stored on a tablet device. Deletion of the content items on the laptop device can cause deletion of the corresponding content items on the tablet device. If the deletion on the laptop device causes deletion of more than a threshold number (or size) of content items on the tablet device, then the laptop device can present a notification indicating that the threshold number (or size) of content items, as described above, will be deleted from the tablet device and prompt the user to undo the content item delete operation.

Figure 11A:
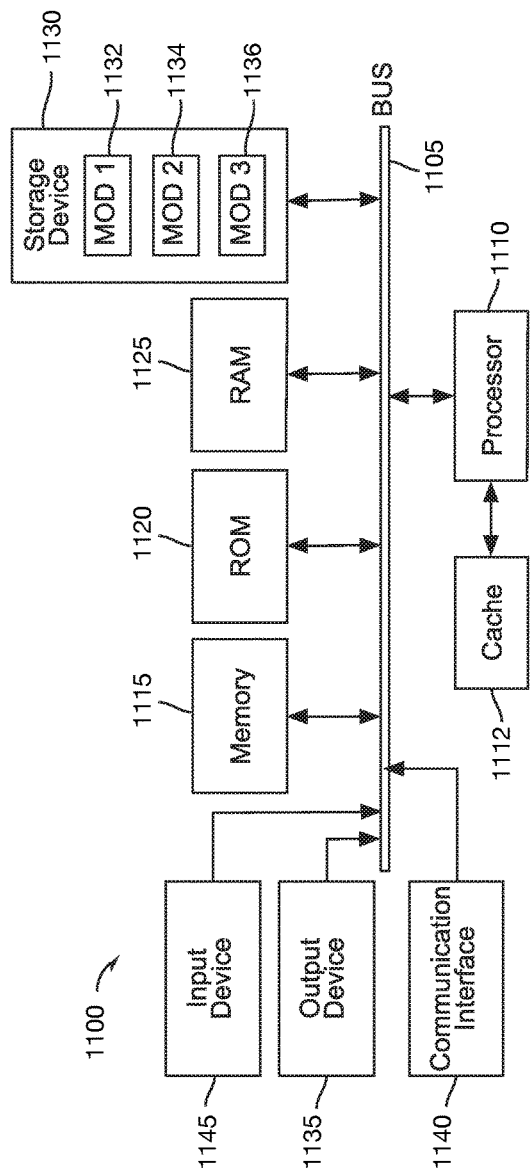
FIGS. 11A-11B show example system embodiments.
Figure 11B:
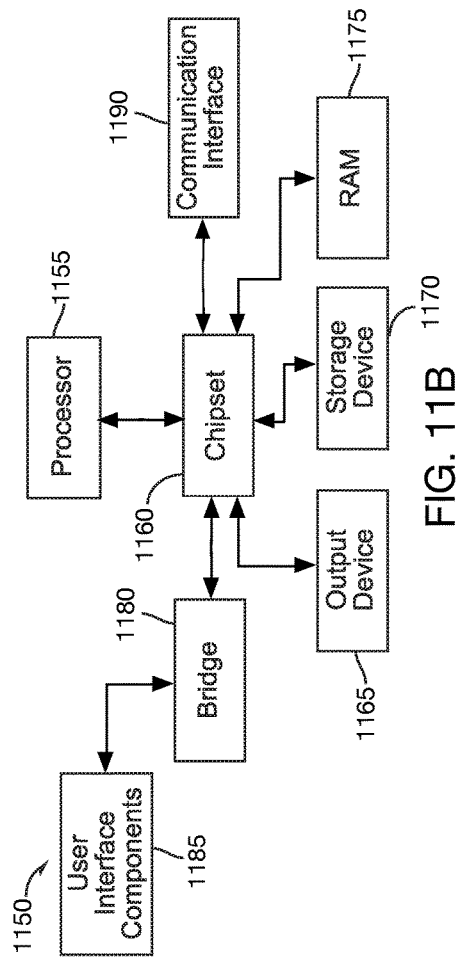

FIG. 11A, and FIG. 11B show example system embodiments. The more appropriate embodiment will be apparent to those of ordinary skill in the art when practicing the present technology. Persons of ordinary skill in the art will also readily appreciate that other system embodiments are possible.

FIG. 11A shows a conventional system bus computing system architecture 1100 wherein the components of the system are in electrical communication with each other using a bus 1105. Example system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B shows a computer system 1150 having a chip set architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:

receiving, at a client device, a move instruction for moving a local copy of a shared content item from a current location on the client device to a destination location, wherein the shared content item is shared between a first user account associated with the client device and one or more second user accounts associated with one or more client devices, the one or more client devices storing respective copies of the shared content item that are synchronized between the current location and respective locations on the one or more client devices;

in response to the move instruction, determining, based on synchronization data, that implementing the move instruction to move the local copy of the shared content item to the destination location causes the respective copies of the shared content item to be deleted from the respective locations on the one or more client devices and whereby the shared content item will become inaccessible to the one or more second user accounts;

in response to determining that moving the local copy to the destination location causes the respective copies to be deleted from the respective locations and the shared content item will become inaccessible to the one or more second user accounts, presenting, on a display of the client device, a prompt comprising:

a notification that moving the local copy of the shared content item from the current location to the destination location will cause the respective copies of the shared content item to be deleted from the respective locations and the shared content item will become inaccessible to the one or more second user accounts;

a first option to undo a move operation associated with the move instruction; and a second option to accept the moving of the local copy of the shared content item from the current location to the destination location; and in response to receiving a selection of the first option, undoing the move operation associated with the move instruction, wherein undoing the move operation comprises returning the copy of the shared content item to the current location at the client device.

2. The method of claim 1, further comprising:
obtaining metadata associated with the shared content item; and
determining, based on the metadata, that the shared content item is shared between the first user account and the one or more second user accounts.

3. The method of claim 2, wherein the metadata includes a shared flag that indicates that the shared content item is shared.

4. The method of claim 2, wherein the metadata includes a shared flag that indicates that a URL has been generated for the shared content item.

5. The method of claim 1, wherein the move operation comprises moving the shared content item from the current location to the destination location, and wherein the move operation causes the shared content item to be deleted from the current location.

6. The method of claim 1, wherein the destination location resides on the client device and is accessible to the first user account.

7. The method of claim 1, further comprising:
before the move instruction, synchronizing the shared content item with a content management system;
before the move instruction, receiving an instruction to share the shared content item via using the content management system with the second one or more user accounts;
in response to the move instruction, determining that the move instruction will cause the shared content item to be removed from the content management system; and
determining that the shared content item will not be accessible to the second one or more user accounts based on the shared content item no longer being available on the content management system.

8. The method of claim 1, wherein returning the shared content item to the current location includes:
determining the current location of the shared content item by referencing a local content item journal, the local content item journal containing an entry for the move instruction; and
deleting the entry for the move instruction.

9. A non-transitory computer-readable medium comprising:
instructions stored thereon which, when executed by one or more processors, cause the one or more processors to:
detect a move operation for relocating a local copy of a shared content item from a current location on a client device to a destination location, wherein the shared content item is shared between a first user account associated with the client device and one or more second user accounts associated with one or more client devices, the one or more client devices storing respective copies of the shared content item that are synchronized between the current location and respective locations on the one or more client devices;
in response to detecting the move operation, determine, based on synchronization data, that the move operation for relocating the local copy of the shared content item to the destination location will cause the respective copies of the shared content item to be removed from the respective locations on the one or more client devices and the shared content item to be inaccessible to the one or more second user accounts;
in response to determining that relocating the local copy to the destination location will cause the respective copies to be removed from the respective locations and the shared content item to be inaccessible to the one or more second user accounts, present a prompt comprising:
a notification that relocating the local copy of the shared content item from the current location to the destination location will cause the respective copies of the shared content item to be removed from the respective locations and the shared content item to be inaccessible to the one or more second user accounts;
a first option to undo the move operation; and
a second option to accept the move operation for relocating the local copy of the shared content item from the current location to the destination location; and
in response to receiving a selection of the first option, undo the move operation to return the local copy of the shared content item to the current location.

10. The non-transitory computer-readable medium of claim 9, wherein relocating the shared content item from the current location to the destination location causes the shared content item to be removed from the current location on the client device and the respective locations on the one or more client devices.

11. The non-transitory computer-readable medium of claim 9, wherein the current location has a shared setting providing the first user account and the one or more second user accounts shared access to the current location, wherein the destination location is outside of the current location and does not have the shared setting, and wherein relocating the local copy of the shared content item to the destination location outside of the current location causes deletion of a respective shared setting associated with the shared content item, and removes the respective copies of the shared content item from the one or more client devices.

12. The non-transitory computer-readable medium of claim 9, storing additional instructions which, when executed by one or more processors, cause the one or more processors to:
in response to the move operation, adding an entry to a content journal stored on the client device, wherein the entry added to the content journal indicates that the shared content item has been removed from the current location.

13. The non-transitory computer-readable medium of claim 9, storing additional instructions which, when executed by one or more processors, cause the one or more processors to:
in response to receiving the selection of the first option, deleting an entry from a content journal stored on the client device, wherein the entry deleted from the content journal indicates that the shared content item has been deleted from the current location.

14. A system comprising:
one or more processors; and
at least one computer-readable medium storing instructions which, when executed by the one or more processors, cause the system to:
receive input associated with a local copy of a shared content item associated with a first user account, the local copy being stored on a collection on the system, wherein the shared content item is shared between the first user account and one or more second user accounts associated with one or more client devices, the one or more client devices storing respective copies of the shared content item that are synchronized between the collection and respective collections on the one or more client devices;

determine that the input is associated with a move operation for relocating the local copy of the shared content item to a location outside of the collection;

in response to determining that the input is associated with the move operation, determine, based on synchronization data, that the move operation for relocating the local copy of the shared content item to the location outside of the collection will cause the respective copies of the shared content item to be removed from the respective collections on the one or more client devices and the shared content item to be inaccessible to the one or more second user accounts;

in response to determining that the move operation will cause the respective copies to be removed from the respective collections and the shared content item to be inaccessible to the one or more second user accounts, presenting a prompt comprising:

a notification that moving the local copy of the shared content item from the collection to the location outside of the collection will cause the respective copies of the shared content item to be removed from the respective collections and the shared content item to be inaccessible to the one or more second user accounts; and a first option to undo the move operation; and a second option to accept the move operation; and in response to receiving a selection of the first option, undo the move operation to return the copy of the shared content item to the collection.

15. The system of claim 14, the at least one computer-readable medium storing instructions which, when executed by the one or more processors, cause the system to:

obtain metadata associated with the shared content item; and determine, based on the metadata, that the shared content item is shared.

16. The system of claim 15, wherein the metadata includes a shared flag that indicates that the shared content item is shared.

17. The system of claim 15, wherein the metadata includes a shared flag that indicates that a URL has been generated for the shared content item.

18. The system of claim 14, wherein, before the move operation, the shared content item is synchronized with the one or more client devices associated with the one or more second user accounts.

19. The system of claim 14, wherein the move operation causes the shared content item to be deleted from the collection.

20. The system of claim 14, wherein the move operation causes the shared content item to be moved to the location outside of the collection, the location being accessible by the first user account.

* * * * *